United States Patent
Saputra et al.

(10) Patent No.: US 12,441,933 B2
(45) Date of Patent: Oct. 14, 2025

(54) FRICTION REDUCER SLURRIES WITH SUSPENDING AGENT

(71) Applicant: Halliburton Energy Services, Inc., Houston, TX (US)

(72) Inventors: I Wayan Rakananda Saputra, Houston, TX (US); Nicole Mast, Houston, TX (US); Denise Nicole Benoit, Houston, TX (US); Larry Steven Eoff, Houston, TX (US); Daniel Bryant Eddings, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/328,930

(22) Filed: Jun. 5, 2023

(65) Prior Publication Data

US 2024/0400888 A1 Dec. 5, 2024

(51) Int. Cl.
*C09K 8/64* (2006.01)

(52) U.S. Cl.
CPC ............ *C09K 8/64* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 5,091,448 A | 2/1992 | Hostettler et al. | |
| 6,258,859 B1 * | 7/2001 | Dahayanake | A61K 8/44 516/77 |
| 6,620,769 B1 | 9/2003 | Juppe et al. | |
| 6,667,354 B1 | 12/2003 | Fox et al. | |
| 7,256,224 B2 | 8/2007 | Martin et al. | |
| 8,356,667 B2 | 1/2013 | Quintero et al. | |
| 8,404,623 B2 * | 3/2013 | Robb | C09K 8/685 507/263 |
| 8,728,989 B2 | 5/2014 | Kakadjian, Sr. et al. | |
| 9,102,863 B2 * | 8/2015 | Robb | C09K 8/60 |
| 9,441,460 B2 | 9/2016 | Noles, Jr. et al. | |
| 10,337,289 B2 | 7/2019 | Panamarathupalayam et al. | |

(Continued)

FOREIGN PATENT DOCUMENTS

| | | |
|---|---|---|
| EP | 1728843 A1 | 12/2006 |
| EP | 1849852 A1 | 10/2007 |

(Continued)

*Primary Examiner* — John J Figueroa
(74) *Attorney, Agent, or Firm* — Sheri Higgins Law, PLLC; Sheri Higgins

(57) ABSTRACT

Friction reducers can be included in a liquid concentrate for use in treatment fluids in oil and gas operations. The liquid concentrate can be a slurry and include oil or a brine as the continuous phase and the friction reducer in dry form as the dispersed phase. The liquid concentrate can be an invert emulsion and include oil as the continuous phase and water and friction reducer dissolved in the water as the dispersed phase. A suspending agent can be included in the liquid concentrate to distribute and suspend the friction reducer throughout the continuous phase. The suspending agent can form micelles that form a mesh-like network to distribute and suspend the friction reducer. A portion of the liquid concentrate can be added to a base fluid at the wellsite to form the treatment fluid. The treatment fluid can be a fracturing fluid.

18 Claims, 5 Drawing Sheets

(56) References Cited

U.S. PATENT DOCUMENTS

| | | | |
|---|---|---|---|
| 10,793,768 B2 | 10/2020 | Patel et al. | |
| 11,118,100 B2 | 9/2021 | Jung et al. | |
| 11,118,101 B2 | 9/2021 | Favero et al. | |
| 11,292,958 B2 | 4/2022 | Bening et al. | |
| 11,326,091 B2 | 5/2022 | Li et al. | |
| 11,365,346 B2* | 6/2022 | Montalvo | E21B 43/267 |
| 11,370,957 B2 | 6/2022 | Bening | |
| 11,781,060 B2 | 10/2023 | Price et al. | |
| 2003/0125215 A1 | 7/2003 | Schwartz et al. | |
| 2008/0087432 A1* | 4/2008 | Wood | C09K 8/602 |
| | | | 507/239 |
| 2009/0090506 A1* | 4/2009 | Schafer | E21B 27/02 |
| | | | 166/278 |
| 2010/0137168 A1* | 6/2010 | Quintero | C09K 19/54 |
| | | | 507/239 |
| 2010/0311623 A1* | 12/2010 | Rey | C09K 8/90 |
| | | | 252/180 |
| 2013/0133886 A1* | 5/2013 | Quintero | E21B 43/16 |
| | | | 166/279 |
| 2013/0261032 A1* | 10/2013 | Ladva | C09K 8/00 |
| | | | 507/131 |
| 2013/0324443 A1* | 12/2013 | Wang | C04B 24/2688 |
| | | | 166/305.1 |
| 2014/0014348 A1* | 1/2014 | Mahoney | C09K 8/805 |
| | | | 507/224 |
| 2014/0060831 A1 | 3/2014 | Miller | |
| 2014/0069643 A1* | 3/2014 | Ogle | C09K 8/52 |
| | | | 166/305.1 |
| 2014/0284057 A1* | 9/2014 | Champagne | C09K 8/602 |
| | | | 166/305.1 |
| 2017/0009125 A1 | 1/2017 | Shaffer et al. | |
| 2017/0073565 A1* | 3/2017 | McDaniel | E21B 21/08 |
| 2021/0054255 A1* | 2/2021 | Elkatatny | C09K 8/36 |
| 2021/0130679 A1 | 5/2021 | Patel et al. | |
| 2021/0189228 A1* | 6/2021 | Patil | C09K 8/86 |

FOREIGN PATENT DOCUMENTS

| | | |
|---|---|---|
| EP | 3013875 B1 | 2/2020 |
| WO | 2015122878 A1 | 8/2015 |

* cited by examiner

FRICTION REDUCER SLURRIES WITH SUSPENDING AGENT

TECHNICAL FIELD

Enhanced recovery of oil or gas from a subterranean formation can utilize stimulation techniques. Stimulation techniques can include fracturing operations. A fracturing fluid can include a variety of additives, such as friction reducers, to provide desirable properties to the fracturing fluid.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIGS. 4A-4H are photographs of an invert emulsion and a friction reducer without a suspending agent showing phase separation over time.

FIGS. 4I-4O are photographs of an invert emulsion, a friction reducer, and a suspending agent showing the friction reducer remains suspended in the liquid continuous phase over time.

DETAILED DESCRIPTION

Figure 1B:
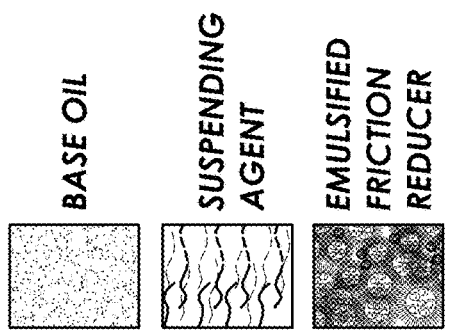
FIGS. 1A and 1B are schematics illustrating an emulsified polyacrylamide friction reducer in a base oil with and without a suspending agent, respectively, according to certain embodiments.
Figure 1B:
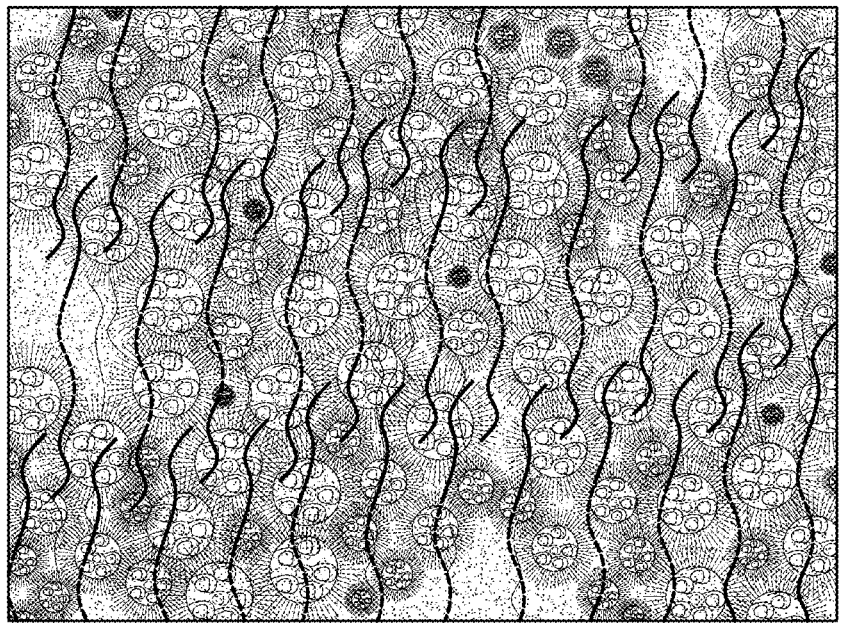

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of about 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be a slurry, which includes a liquid external or continuous phase and undissolved solid particles as the internal or dispersed phase; an emulsion, which includes a liquid continuous phase and at least one dispersed phase of immiscible liquid droplets; a foam, which includes a liquid continuous phase and a gas as the dispersed phase; or a mist, which includes a gas continuous phase and liquid droplets as the dispersed phase. As used herein, the term "base fluid" means the solvent of a solution or the continuous phase of a heterogeneous fluid and is the liquid that is in the greatest percentage by volume of a treatment fluid. An emulsion has a continuous phase of water and immiscible liquid oil droplets as the dispersed or internal phase or has a continuous phase of an oil and immiscible liquid water droplets as the dispersed or internal phase. When naming an emulsion type, the first letter is the dispersed or internal phase. Accordingly, O/W is oil in water and is classified as an "emulsion"; whereas W/O is water in oil and is classified as an "invert emulsion".

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

During wellbore operations, it is common to introduce a treatment fluid into the well. Examples of common treatment fluids include, but are not limited to, drilling fluids, spacer fluids, completion fluids, and stimulation fluids. Friction reducers may be added to a treatment fluid. The friction reducer functions to decrease the friction of the treatment fluid against tubing strings and other wellbore equipment during introduction into the well. Some friction reducers can reduce friction pressures by up to about 70% to 80%.

Friction reducers can be in the form of dry powder. A dry form of the friction reducer can provide high activity and can be highly effective in reducing friction on wellbore equipment during pumping. However, the handling of a dry powder can be problematic because there is currently limited equipment designed to safely handle the dry powder or add it to a treatment fluid. Therefore, a liquid concentrate that includes a liquid and the friction reducer can be stored and transported to a wellsite to then be added to a treatment fluid for use in an oil or gas treatment fluid. Adding the friction reducer as a liquid concentrate to a treatment fluid is easier and safer for personnel. The liquid concentrate can be an oil-based slurry that includes a dry form of the friction reducer as the dispersed phase and an oil as the continuous phase. However, if the dry friction reducer is added to the oil, then phase separation can occur, wherein the density difference between the friction reducer and the oil causes the friction reducer to settle to the bottom of the storage container.

The liquid concentrate can also include the friction reducer in a liquid form as opposed to a dry form. These types of friction reducers can be manufactured through an invert emulsion polymerization method, hence the name Emulsified Polyacrylamide (EPAM). In this form, the polymer is dissolved in water and then included in a base oil as the continuous phase to form a water-in-oil invert emulsion. These types of friction reducers are widely used in the oil and gas industry due to their ease of handling, as it is already in liquid form. However, these invert emulsions can also encounter separation and settling problems due to density issues with the dispersed water/FR droplets being heavier than the oil continuous phase.

Another current approach is to add the dry friction reducer to water instead of oil to form the liquid concentrate. However, because most friction reducers are water-soluble or water-hydratable, adding the friction reducer to water allows the friction reducer to hydrate, which causes the viscosity of the concentrate to increase and can render the friction reducer useless. Such an increase in viscosity can render the concentrate too viscous to add to a treatment fluid at the wellsite. Accordingly, salt can be added to the water to inhibit or prevent hydration of the friction reducer. As with oil as the base fluid, the density difference between the dry friction reducer and a saturated saltwater causes the friction reducer (FR) to float to the top of the storage container. In each of these two systems (i.e., dry FR in oil or dry FR in salt water), an evenly dispersed phase in the continuous phase is not achieved due to the density differences between the friction reducer and the continuous phase of the slurry.

These heterogeneous, liquid concentrates including the FR are intended to be added directly to a base fluid and possibly other ingredients to form a treatment fluid at the wellsite prior to pumping the treatment fluid into the well. Calculations are performed and metering devices are used to add the liquid concentrate to the base fluid to obtain a desired concentration of the friction reducer in the treatment fluid. If phase separation has occurred in the liquid concentrate with the friction reducer either settling to the bottom or floating to the top of the container, then the actual concentration of friction reducer added to the treatment fluid will not be accurate-most likely being a lesser concentration than desired or needed. Currently, there is no way to prevent phase separation and ensure even distribution of the friction reducer throughout the continuous phase of the liquid concentrate. Thus, there is a long-felt need to provide a liquid concentrate with the friction reducer evenly distributed in the continuous phase. It is to be understood that as used herein, reference to a "liquid concentrate" does not require the friction reducer to be in a specific concentration in the liquid concentrate nor limit the total volume of the liquid concentrate, but rather means a heterogeneous fluid including the friction reducer that is then added to a base fluid and optionally other ingredients to form a treatment fluid, wherein the concentration of the friction reducer in the treatment fluid (e.g., a fracturing fluid) is less than or equal to the concentration of the friction reducer in the liquid concentrate.

It has been discovered that a suspending agent can be used in a variety of heterogeneous fluid liquid concentrates that suspend and evenly disperses a friction reducer in a continuous phase of the heterogeneous fluid. The liquid concentrate can be prepared and placed in a container for storage and/or transportation to a specific wellsite. The liquid concentrate can then be added to a base fluid and optionally other ingredients at the wellsite to form a treatment fluid for use in an oil and gas operation. It has also been discovered that the suspending agent can be added post-manufacturing to an EPAM friction reducer to enhance the stability of the EPAM friction reducer and allow for better homogenization of the friction reducer during the addition to a treatment fluid.

A liquid concentrate can be a slurry consisting essentially of a liquid continuous phase, wherein the liquid continuous phase comprises an oil; a water-soluble friction reducer in dry form as a dispersed phase; and a suspending agent, wherein the suspending agent is in a critical micelle concentration and has thixotropic properties. The liquid continuous phase of the slurry can instead be saltwater including water and a water-soluble salt. The liquid concentrate can also be an invert emulsion consisting essentially of a liquid continuous phase comprising an oil; a dispersed phase comprising water and a water-soluble friction reducer dissolved in the water; and a suspending agent, wherein the suspending agent is in a critical micelle concentration and has thixotropic properties.

A method of treating a portion of a subterranean formation can include forming a treatment fluid by combining a base fluid with an amount of a liquid concentrate, wherein the liquid concentrate consists essentially of: a liquid continuous phase; a water-soluble friction reducer as a dispersed phase; and a suspending agent, wherein the suspending agent is in a critical micelle concentration and has thixotropic properties; and introducing the treatment fluid into the subterranean formation.

It is to be understood that the discussion of the liquid concentrate is intended to apply to all of the composition and method embodiments without the need to repeat the various embodiments throughout. Any reference to the unit "gallons" means U.S. gallons.

It is to be understood that the liquid concentrate consists essentially of the ingredients. Therefore, while the liquid concentrate can include minor amounts of other ingredients, those other ingredients should not materially affect the basic and novel characteristics of the liquid concentrate. Accordingly, it is the suspending agent that is primarily or wholly responsible for providing suspension of the friction reducer in the liquid continuous phase. Therefore, the liquid concentrate does not need to include and according to any of the embodiments does not include other ingredients, such as surfactants, emulsifiers, or viscosifiers, in order for the friction reducer to be dispersed and suspended in the liquid continuous phase.

The liquid concentrate can be a heterogeneous fluid. The heterogeneous fluid can be a slurry and can include a liquid continuous phase comprising an oil and a friction reducer in dry form, commonly referred to as an oil-based slurry. The oil can be selected from the group consisting of natural oils, modified oils, synthetic oils, and combinations thereof in any proportion. Non-limiting examples of oils include paraffinic hydrocarbons, naphthenic hydrocarbons, aromatic hydrocarbons, and mixtures thereof. The paraffin hydrocarbons can include saturated, linear, or branched paraffin hydrocarbons. Examples of aromatic hydrocarbons include, but are not limited to, benzene, toluene, and xylene. Additional examples of oils include mineral oils, vegetable oils, kerosenes, naphthas, and petrolatums.

The liquid continuous phase can include only the oil. The oil-based slurry can include the oil at a concentration in the range of 50 to 85 weight percent (wt %) of the slurry. As used herein, the phrase "oil-based slurry" means a fluid having a liquid continuous oil phase and a friction reducer in dry form as the dispersed phase.

According to other embodiments, the heterogeneous fluid can be an invert emulsion (e.g., EPAM) including an oil continuous phase and a liquid dispersed phase including water and the water-soluble friction reducer. The friction reducer can be dissolved in the water. The water for the invert emulsion can be freshwater or can include a water-soluble salt. Although reference may be made to "polyacrylamide" as the friction reducer for the invert emulsion such as EPAM, it is to be understood that other types of polymeric friction reducers can be used besides polyacrylamide. As used herein, the phrase "invert emulsion" means a fluid having a liquid oil continuous phase and water and a friction reducer in liquid form as the dispersed phase.

The oil-based slurry includes a water-soluble friction reducer in dry form as a dispersed phase of the slurry. As used herein, the term "water soluble" means that at least 1 gram dissolves in 1 liter of the water at a temperature of 21.7° C. (71° F.). The invert emulsion includes a water-soluble friction reducer dissolved in the water. The friction reducer according to either of these embodiments can be a polymer, for example, a homopolymer or a copolymer. The polymer can be an anionic polymer, a cationic polymer, a nonionic polymer, or an amphoteric polymer. The friction reducer can be hydratable in water. As used herein, the phrase "hydratable in water" means the ability to absorb water and swell.

A polymer is a molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain pendant functional groups connected to the backbone at various locations along the backbone. Polymer nomenclature is generally based upon the type of monomer residues comprising the polymer. A polymer formed from one type of monomer residue is called a homopolymer. A polymer formed from two or more different types of monomer residues is called a copolymer. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer. Polymer molecules can be cross-linked. As used herein, a "cross-link" and all grammatical variations thereof is a bond between two or more polymer molecules. Cross-linked polymer molecules can form a polymer network.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight ($M_w$) for a copolymer can be expressed as follows:

$$M_w = \sum w_x M_x$$

where $w_x$ is the weight fraction of molecules whose weight is $M_x$.

Typically, the composition of the water-soluble polymer will be generally the same or about the same as the composition of the monomer mixture. Examples of monomers for the oil-based slurry or the invert emulsion include acrylamide, acrylic acid, 2-acrylamido-2-methylpropane sulfonic acid, acrylamido tertiary butyl sulfonic acid, N,N-dimethylacrylamide, vinyl sulfonic acid, N-vinyl acetamide, N-vinyl formamide, itaconic acid, methacrylic acid, acrylic acid esters, methacrylic acid esters, and combinations thereof. According to any of the embodiments, the water-soluble friction reducer polymer includes a cationic monomer, such as (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, or dimethylaminopropylmethacrylamide. The (meth)acrylamidopropyltrimethyl ammonium halide can be (meth)acrylamidopropyltrimethyl ammonium chloride ("MAPTAC") or acryloyloxyethyltrimethyl ammonium chloride ("AETAC"). The diallyl dimethyl ammonium halide can be diallyl dimethyl ammonium chloride ("DADMAC"). Examples of water-soluble friction reducer polymers can include, but are not limited to, a polyacrylamide, a polyacrylamide derivative, a synthetic polymer, an acrylamide copolymer, an anionic acrylamide copolymer, a cationic acrylamide copolymer, a non-ionic acrylamide copolymer, an amphoteric acrylamide copolymer, a polyacrylate, a polyacrylate derivative, a polymethacrylate, a polymethacrylate derivative, and combinations thereof. The water-soluble friction reducer polymer can be in an acid form or in a salt form. A variety of salts can be prepared, for example, by neutralizing an acid form of the monomers. In addition, the acid form of the water-soluble polymer can be neutralized by ions present in the treatment fluid. The water-soluble friction reducer polymer can have a molecular weight in the range of 8 to 35 million Daltons.

For the oil-based slurry or the invert emulsion, the water-soluble friction reducer can be in a concentration in the range of 1 to 40 wt % of the liquid concentrate.

The oil-based slurry and the invert emulsion includes a suspending agent. The suspending agent can be a di-block copolymer of styrene/butadiene. A di-block copolymer of styrene/butadiene is not a surfactant. According to any of the embodiments, the oil-based slurry does not include a surfactant. The difference in water solubility for each block of the polymer (i.e., styrene blocks and butadiene blocks) means each block has a different affinity for the oil phase and allows micelles to form. If the suspending agent is in a sufficient concentration in the slurry, then the suspending agent molecules can form micelles. A "micelle" is an aggregate of molecules dispersed in a solution. The suspending agent must be in a sufficient concentration to form micelles, known as the critical micelle concentration (CMC). The critical micelle concentration is the concentration of suspending agent above which micelles are spontaneously formed. According to any of the embodiments for the oil-based slurry and the invert emulsion, the critical micelle concentration of the suspending agent can be a concentration in the range of 0.5 to 54 wt % of the liquid concentrate.

Figure 1A:
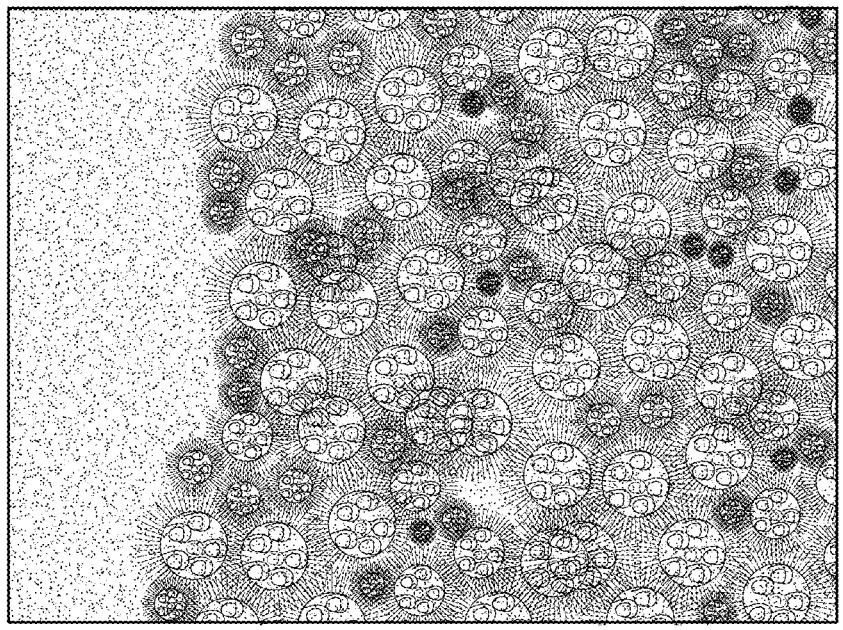
Figure 2B:
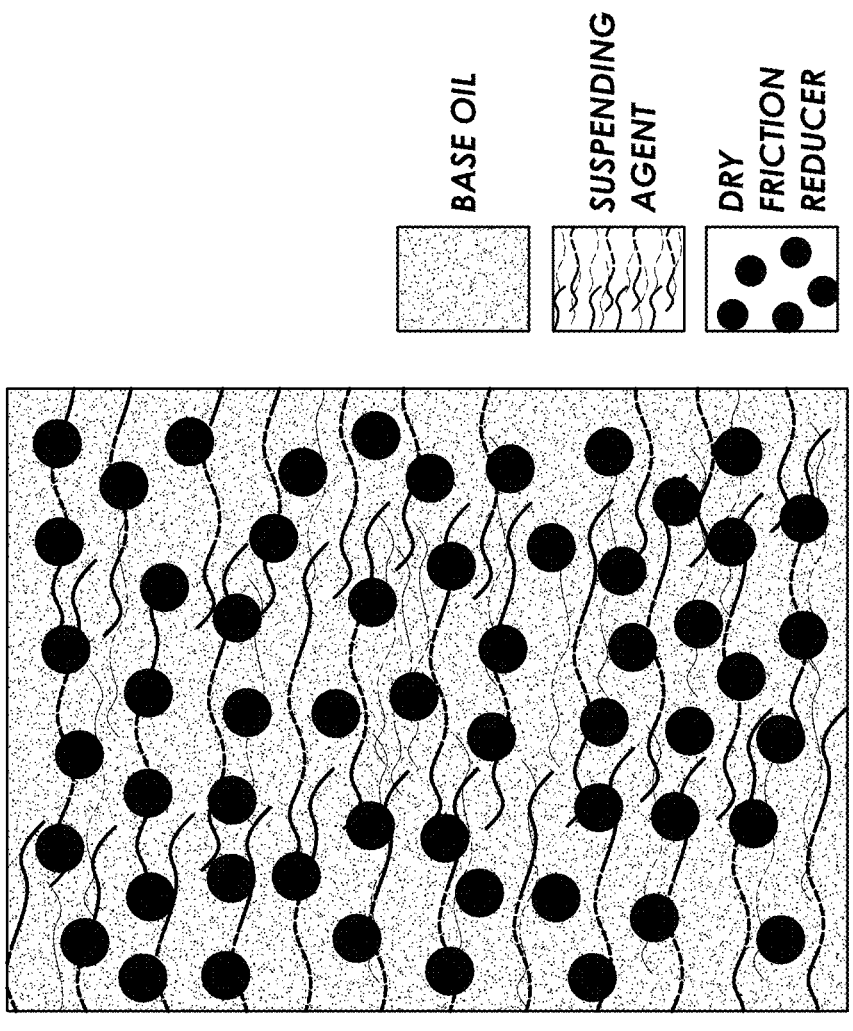
FIGS. 2A and 2B are schematics illustrating a dry friction reducer added to a base oil with and without a suspending agent, respectively, according to certain embodiments.
Figure 2A:
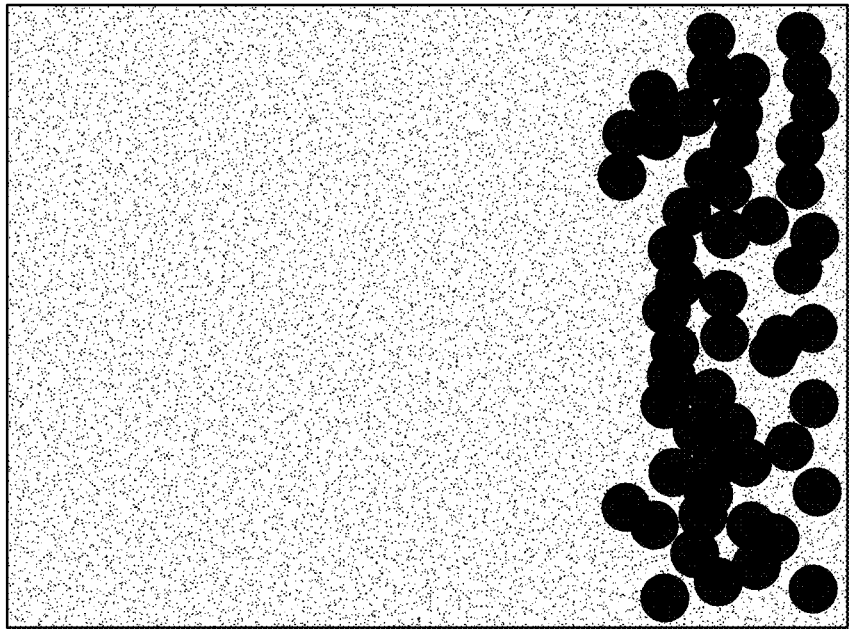

The formed micelles can create a mesh-like network to suspend the friction reducer in the liquid continuous phase of the oil-based slurry or the invert emulsion. It is to be understood that the friction reducer does not chemically interact with the micelles, but rather is suspended and dispersed throughout the liquid continuous phase by the mesh-like network formed. By way of example and as shown in FIG. 1A without a suspending agent, the emulsified friction reducer settles in the bottom of a container, and as shown in FIG. 2A without a suspending agent, the dry friction reducer settles to the bottom of the container having oil as the liquid continuous phase. However, as shown in FIGS. 1B and 2B, the micelle formation of the suspending agent allows the friction reducer to be suspended and dispersed throughout the oil-based liquid continuous phase. The micelles have polar hydrophilic heads and hydrophobic tails. The mesh-like network can be formed by interaction of tail-tail or head-head of different micelles.

According to other embodiments, the liquid concentrate is a water-based slurry including water and a water-soluble salt as the continuous phase and the friction reducer in dry form as the dispersed phase. As used herein, the phrase "water-based slurry" means a fluid having water as the continuous phase and the friction reducer in dry form as the dispersed phase. The water-soluble salt can include any combination of potassium, ammonium, calcium, magnesium, formate, carbonate, bromide, chloride, nitrate, and sulfate ions. As discussed above, the water-soluble friction reducer can solubilize and/or swell in the presence of water, which can lead to an undesirable increase in viscosity of the slurry. Premature hydration also reduces the efficacy of the friction reducer to reduce friction in the wellbore during a hydraulic fracturing process. The salt can substantially inhibit or prevent the water-soluble friction reducer from causing an increase in viscosity. It is to be understood that some of the water-soluble friction reducer can solubilize and/or swell in the water, but preferably the viscosity does not increase such that the slurry is not pourable. Preferably, the concentration of the salt and the type of the salt in the water is selected such that the viscosity of the slurry does not exceed 500 centipoise (cP) via solubilization and/or swelling of the friction reducer. According to any of the embodiments, the water is in a concentration in the range of 10 to 50 wt % of the water-based slurry. According to any of the embodiments, the salt is in a concentration in the range of 20 to 65 wt % of the water-based slurry.

For the water-based slurry, the water-soluble friction reducer can be an anionic polymer. The anionic polymer can be a copolymer containing acrylamide and acrylic acid monomer residues. The anionic polymer can also be a terpolymer containing acrylamide/acrylic acid/2-acrylamido-2-methylpropane sulfonic acid (AMPS) monomer residues. Examples of monomers for the water-based slurry include acrylamide, acrylic acid, 2-acrylamido-2-methylpropane sulfonic acid, acrylamido tertiary butyl sulfonic acid, N,N-dimethylacrylamide, vinyl sulfonic acid, N-vinyl acetamide, N-vinyl formamide, itaconic acid, methacrylic acid, acrylic acid esters, methacrylic acid esters, and combinations thereof. Examples of water-soluble friction reducer polymers can include, but are not limited to, a polyacrylamide, a polyacrylamide derivative, a synthetic polymer, an acrylamide copolymer, an anionic acrylamide copolymer, a cationic acrylamide copolymer, a non-ionic acrylamide copolymer, an amphoteric acrylamide copolymer, a polyacrylate, a polyacrylate derivative, a polymethacrylate, a polymethacrylate derivative, and combinations thereof. The water-soluble friction reducer polymer can be in an acid form or in a salt form. A variety of salts can be prepared, for example, by neutralizing an acid form of the monomers. In addition, the acid form of the water-soluble polymer can be neutralized by ions present in the treatment fluid. The water-soluble friction reducer polymer can have a molecular weight in the range of 8 to 35 million Daltons.

The water-soluble friction reducer for the water-based slurry can be in a concentration in the range of 10 to 45 wt % of the slurry.

The water-based slurry also includes a suspending agent. The suspending agent can be a viscoelastic surfactant (VES). Viscoelasticity is the property of materials that exhibit both viscous and elastic characteristics when undergoing deformation. Viscous materials resist shear flow and strain linearly with time when a stress is applied; whereas elastic materials strain when stretched and quickly return to their original state once the stress is removed. Viscoelastic materials have elements of both of these properties and, as such, exhibit time-dependent strain.

There are several factors that can affect the viscoelasticity of a viscoelastic surfactant. For example, the shape of the aggregation of the micelles (whether rod-shaped or spherical-shaped) can depend on the chemical structure of the surfactant, concentration of the surfactant, the nature of counter ions present in the slurry, salt concentration, pH, solubilized components (if any), co-surfactants, and temperature. The salt present in the water-based slurry can help to form and stabilize micelle aggregation of the VES. According to any of the embodiments, the VES should function effectively at the concentration and type of salt selected in the water-based slurry.

The suspending agent for the water-based slurry can be selected from viscoelastic surfactants having an anionic, cationic, or zwitterionic headgroup, including but not limited to, tallow amidoamine oxide, ethoxylated ammonium chloride, alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkylbenzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols, quaternary amine compounds, amine oxide compounds, quad-diamines compounds, erucic dimethyl amidopropyl betaine, dicarboxylic coconut derived sodium salt, cocamidopropyl dimethylamine, cocamidopropyl betaine, alkylether hydroxypropyl sultaine, or amine oxide. According to any of the embodiments, the VES can have an alkyl chain length greater than or equal to 16.

According to any of the embodiments, the suspending agent for the water-based slurry is in a concentration in the range of 0.25 to 10 wt % of the water-based slurry. The concentration of the salt in the water-based slurry can decrease the amount of the suspending agent needed.

Figure 3B:
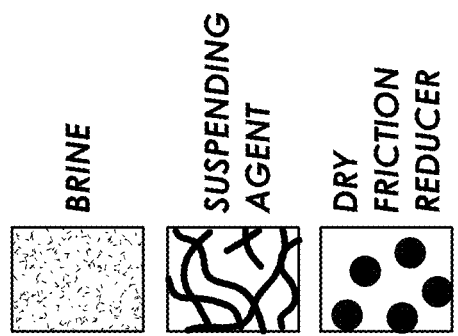
FIGS. 3A and 3B are schematics illustrating a dry friction reducer added to a brine base fluid with and without a suspending agent, respectively, according to certain embodiments.
Figure 3B:
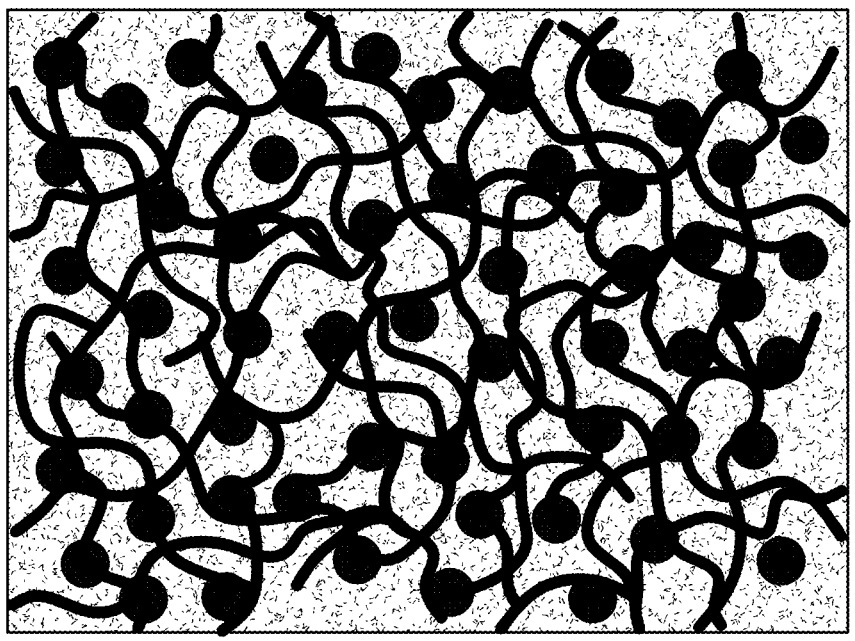
Figure 3A:
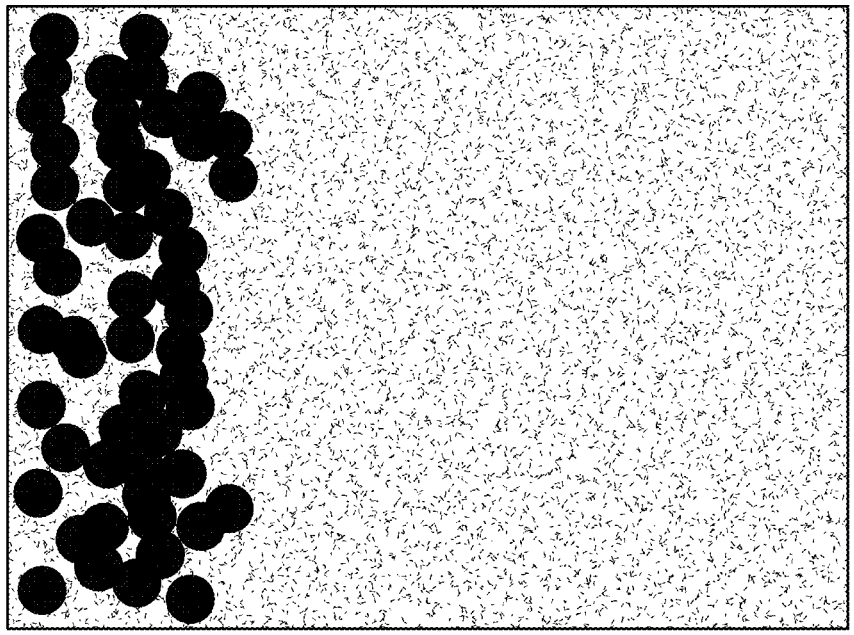
Figures 4A, 4O:
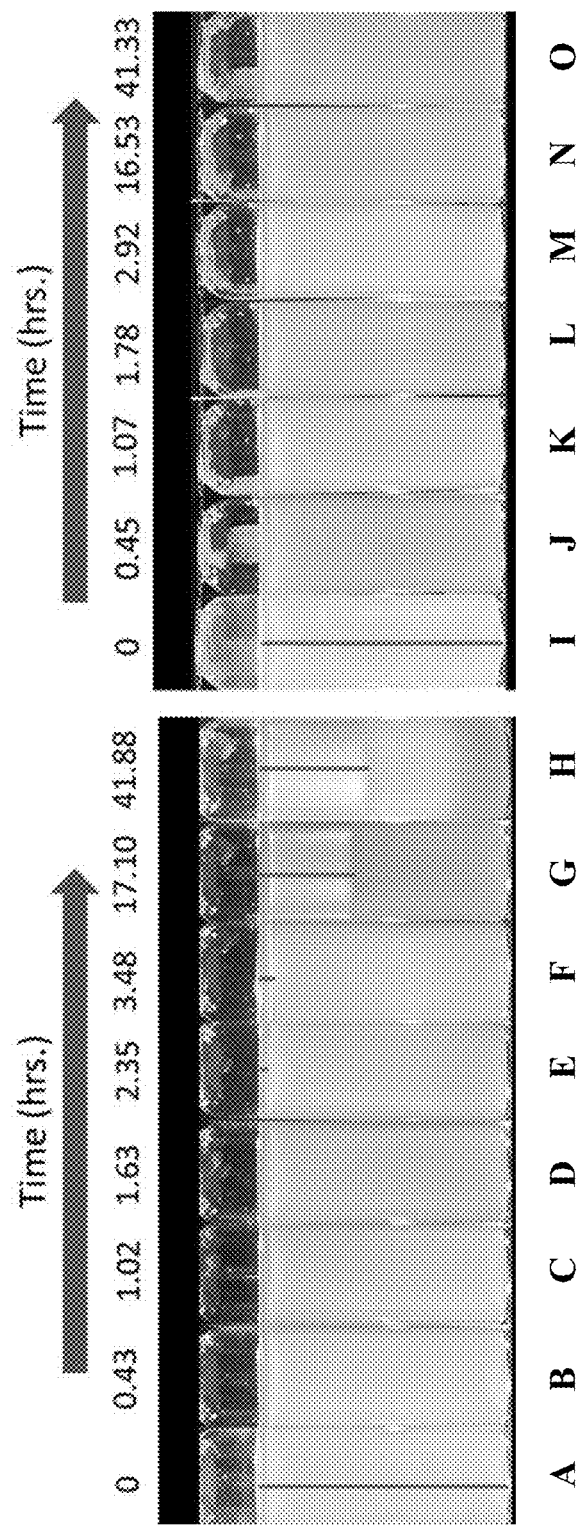

The suspending agent for the water-based slurry is in a critical micelle concentration. As with the oil-based slurry and the invert emulsion, the micelle formation can form a mesh-like network in which the water-soluble friction reducer can be suspended. By way of example and as shown in FIG. 3A without a suspending agent, the dry friction reducer floats to the top of a container. However, as shown in FIG. 3B, the micelle formation of the suspending agent allows the friction reducer to be suspended and dispersed throughout the water/salt liquid continuous phase.

The suspending agent for the liquid concentrate (e.g., the oil-based slurry, the invert emulsion, or the water-based slurry) has thixotropic properties. Thixotropy is a time-dependent, shear thinning property. Some fluids that are viscous under static conditions will attain fluid-like properties (i.e., flow more easily) over time when shaken, agitated, or otherwise have a stress applied to the fluid. These fluids then require a fixed time to return to their more viscous state. Some non-Newtonian, pseudo plastic fluids show a time-dependent change in viscosity; meaning that the longer the fluid undergoes shear stress, the lower its viscosity. By contrast, a thixotropic fluid is a fluid that takes a fixed amount of time to attain an equilibrium viscosity when introduced to a step change in shear rate. Some thixotropic fluids return to a more viscous state almost instantly, such as ketchup, and are called pseudo plastic fluids. Other thixotropic fluids, such as yogurt, take much longer to reach the equilibrium viscosity and can become nearly solid. According to any of the embodiments, the suspending agent can exhibit a stable form at rest with an increase in viscosity or gel strength but becomes fluid-like when agitated with a decrease in viscosity or gel strength. Accordingly, the thixotropic property of the suspending agent allows the suspending agent to suspend and disperse the friction reducer in the liquid continuous phase during storage and/or transportation but allows the liquid concentrate to be poured or added to a treatment fluid and exhibit shear thinning behavior during pumping into a subterranean formation.

The methods include forming a treatment fluid by combining a base fluid with an amount of the liquid concentrate. The liquid concentrate can be the oil-based slurry, the invert emulsion, or the water based-slurry as discussed above. The treatment fluid can be a stimulation fluid. The stimulation fluid can be a fracturing fluid. The base fluid can include water and optionally dissolved additives. The treatment fluid can also include undissolved additives. The treatment fluid can include proppant. As used herein, the term "proppant" means a multitude of solid particles. The treatment fluid can further include other additives. The other additives can include, but are not limited to, tackifying agents, resins, curable resins, curing agents for a curable resin, oxygen scavengers, alcohols, scale inhibitors, fluid-loss additives, oxidizers, bactericides, and biocides.

According to any of the embodiments, the suspending agent is included in the liquid concentrate prior to arrival at a wellsite. The methods can further include adding the suspending agent to the liquid concentrate prior to arrival at the wellsite. The methods can further include preparing the liquid concentrate, for example preparing the oil-based slurry or the water-based slurry, by combining the liquid continuous phase and the friction reducer in dry form. The slurry can be prepared at a location that is not at the wellsite. The location can be a remote location. The slurry can also be stored at a storage facility. The methods can further include preparing or obtaining the invert emulsion liquid concentrate and adding the suspending agent to the invert emulsion at a remote location. The slurries or the invert emulsion including the suspending agent can then be transported from the storage facility to the wellsite for use. The location can also be a preparation facility wherein the slurry or the invert emulsion is then transported to the wellsite for use and not stored. The slurries or invert emulsion, once transported to the wellsite, can be stored at the wellsite until use. It is to be understood that the liquid concentrate is not prepared at the wellsite in what is commonly called on-the-fly. Rather, the liquid concentrate is prepared offsite and then transported to the wellsite for use in the treatment fluid.

According to other embodiments, the suspending agent is added to the liquid concentrate at the wellsite. According to these embodiments, the slurries can be prepared offsite with the liquid continuous phase and the water-soluble friction reducer in dry form, and then transported to the wellsite. According to these embodiments, the invert emulsion can be prepared or obtained and then transported to the wellsite. According to these embodiments, phase separation is likely to occur because the liquid concentrate does not include any suspending agent, or the correct suspending agent, or an insufficient concentration of suspending agent. Therefore, according to these embodiments, the suspending agent can be added to the slurries or the invert emulsion at the wellsite and before use to suspend and disperse the friction reducer throughout the liquid continuous phase. According to these embodiments, the slurries or the invert emulsion can be mixed after addition of the suspending agent and before being added to form the treatment fluid for use in an oil or gas operation. By way of example, mixing can be performed after the addition of the suspending agent and before a desired amount of the slurry or the invert emulsion in added to a base fluid to form a treatment fluid.

The amount of the liquid concentrate that is combined with the base fluid to form the treatment fluid can vary. The amount can be either a desired volume or a desired weight of the liquid concentrate. As discussed above, when phase separation occurs, the desired amount of the slurry or invert emulsion that needs to be added to the base fluid to form the treatment fluid can be difficult to determine because the friction reducer is not properly dispersed throughout the liquid continuous phase. One significant advantage to the embodiments disclosed herein is that a more accurate determination of the amount of slurry or invert emulsion that needs to be added can be made. By way of example, the concentration of the friction reducer that is added to the liquid continuous phase can be known when the slurry is prepared. With the benefit of the suspending agent allowing the friction reducer to be more evenly dispersed and suspended in the liquid continuous phase, then the concentration of friction reducer in the slurry can be assumed to be the same regardless of whether the slurry is poured from the top of the container or pulled from a bottom of the container—and regardless of whether the slurry has been stored for 15 minutes or 40 hours at the wellsite. Accordingly, the amount of slurry that is combined with the base fluid can be predetermined and calculated based on the concentration of the friction reducer in the slurry and the desired concentration of the friction reducer in the treatment fluid. The methods can further include determining the amount of the liquid concentrate that is combined with the base fluid to form the treatment fluid.

The methods include introducing the treatment fluid into the subterranean formation. The methods can include introducing the treatment fluid into a portion of a wellbore that penetrates the subterranean formation. The treatment fluid can be introduced using one or more pumps. The treatment fluid can be introduced to perform an oil or gas operation. The oil or gas operation can be a stimulation operation, such as a hydraulic fracturing operation.

An embodiment of the present disclosure is a liquid concentrate consisting essentially of: a liquid continuous phase, wherein the liquid continuous phase comprises an oil; a dispersed phase, wherein the dispersed phase comprises a water-soluble friction reducer; and a suspending agent, wherein the suspending agent is in a critical micelle concentration and has thixotropic properties. Optionally, the oil is in a concentration in a range of 50 to 85 wt % of the slurry. Optionally, the liquid concentrate is an invert emulsion, and wherein the dispersed phase further comprises water, and wherein at least a portion of the water-soluble friction reducer is dissolved in the water. Optionally, the liquid concentrate is an oil-based slurry, and wherein the water-soluble friction reducer is in a dry form. Optionally, the water-soluble friction reducer is an anionic polymer, a cationic polymer, a nonionic polymer, or an amphoteric polymer. Optionally, the polymer comprises monomers selected from the group consisting of acrylamide, acrylic acid, 2-acrylamido-2-methylpropane sulfonic acid, acrylamido tertiary butyl sulfonic acid, N,N-dimethylacrylamide, vinyl sulfonic acid, N-vinyl acetamide, N-vinyl formamide, itaconic acid, methacrylic acid, acrylic acid esters, methacrylic acid esters, (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, dimethylaminopropylmethacrylamide, and combinations thereof. Optionally, the water-soluble friction reducer is in a concentration in a range of 1 to 40 wt % of the liquid concentrate. Optionally, the suspending agent is a di-block copolymer of styrene/butadiene. Optionally, the suspending agent is in a concentration in a range of 0.5 to 54 wt % of the liquid concentrate.

Another embodiment of the present disclosure is a liquid concentrate consisting essentially of: a liquid continuous phase, wherein the liquid continuous phase comprises water and a water-soluble salt; a dispersed phase, wherein the dispersed phase comprises a water-soluble friction reducer in dry form; and a suspending agent, wherein the suspending agent is in a critical micelle concentration and has thixotropic properties. Optionally, the water-soluble salt includes any combination of potassium, ammonium, calcium, magnesium, formate, carbonate, bromide, chloride, nitrate, or sulfate ions. Optionally, the water is in a concentration in a range of 10 to 50 wt % of the liquid concentrate. Optionally, the water-soluble salt is in a concentration in a range of 20 to 65 wt % of the liquid concentrate. Optionally, the water-soluble friction reducer is an anionic copolymer containing acrylamide and acrylic acid monomer residues or a terpolymer containing acrylamide/acrylic acid/2-acrylamido-2-methylpropane sulfonic acid (AMPS) monomer residues. Optionally, the water-soluble friction reducer is selected from the group consisting of a polyacrylamide, a polyacrylamide derivative, a synthetic polymer, an acrylamide copolymer, an anionic acrylamide copolymer, a cationic acrylamide copolymer, a non-ionic acrylamide copolymer, an amphoteric acrylamide copolymer, a polyacrylate, a polyacrylate derivative, a polymethacrylate, a polymethacrylate derivative, and combinations thereof. Optionally, the water-soluble friction reducer is in a concentration in a range of 10 to 45 wt % of the liquid concentrate. Optionally, the suspending agent is a viscoelastic surfactant having an anionic, cationic, or zwitterionic headgroup, selected from tallow amidoamine oxide, ethoxylated ammonium chloride, alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkylbenzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols, quaternary amine compounds, amine oxide compounds, quad-diamines compounds, erucic dimethyl amidopropyl betaine, dicarboxylic coconut derived sodium salt, cocamidopropyl dimethylamine, cocamidopropyl betaine, alkylether hydroxypropyl sultaine, or amine oxides. Optionally, the suspending agent is in a concentration in a range of 0.25 to 10 wt % of the liquid concentrate.

Another embodiment of the present disclosure is a method of treating a portion of a subterranean formation comprising: forming a treatment fluid by combining a base fluid with an amount of a liquid concentrate, wherein the liquid concentrate consists essentially of: a liquid continuous phase; a dispersed phase, wherein the dispersed phase comprises a water-soluble friction reducer; and a suspending agent, wherein the suspending agent is in a critical micelle concentration and has thixotropic properties; and introducing the treatment fluid into the subterranean formation. Optionally, the treatment fluid is a stimulation fluid. Optionally, introduction of the treatment fluid is part of a stimulation operation. Optionally, the liquid continuous phase comprises an oil. Optionally, the oil is in a concentration in a range of 50 to 85 wt % of the slurry. Optionally, the liquid concentrate is an invert emulsion, and wherein the dispersed phase further comprises water, and wherein at least a portion of the water-soluble friction reducer is dissolved in the water. Optionally, the liquid concentrate is an oil-based slurry, and wherein the water-soluble friction reducer is in a dry form. Optionally, the water-soluble friction reducer is an anionic polymer, a cationic polymer, a nonionic polymer, or an amphoteric polymer. Optionally, the polymer comprises monomers selected from the group consisting of acrylamide, acrylic acid, 2-acrylamido-2-methylpropane sulfonic acid, acrylamido tertiary butyl sulfonic acid, N,N-dimethylacrylamide, vinyl sulfonic acid, N-vinyl acetamide, N-vinyl formamide, itaconic acid, methacrylic acid, acrylic acid esters, methacrylic acid esters, (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, dimethylaminopropylmethacrylamide, and combinations thereof. Optionally, the water-soluble friction reducer is in a concentration in a range of 1 to 40 wt % of the liquid concentrate. Optionally, the suspending agent is a di-block copolymer of styrene/butadiene. Optionally, the suspending agent is in a concentration in a range of 0.5 to 54 wt % of the liquid concentrate. Optionally, the liquid continuous phase comprises water and a water-soluble salt and the water-soluble friction reducer is in a dry form. Optionally, the water-soluble salt includes any combination of potassium, ammonium, calcium, magnesium, formate, carbonate, bromide, chloride, nitrate, or sulfate ions. Optionally, the water is in a concentration in a range of 10 to 50 wt % of the liquid concentrate. Optionally, the water-soluble salt is in a concentration in a range of 20 to 65 wt % of the liquid concentrate. Optionally, the water-soluble friction reducer is an anionic copolymer containing acrylamide and acrylic acid monomer residues or a terpolymer containing acrylamide/acrylic acid/2-acrylamido-2-methylpropane sulfonic acid (AMPS) monomer residues. Optionally, the water-soluble friction reducer is selected from the group consisting of a polyacrylamide, a polyacrylamide derivative, a synthetic polymer, an acrylamide copolymer, an anionic acrylamide copolymer, a cationic acrylamide copolymer, a non-ionic acrylamide copolymer, an amphoteric acrylamide copolymer, a polyacrylate, a polyacrylate derivative, a polymethacrylate, a polymethacrylate derivative, and combinations thereof. Optionally, the water-soluble friction reducer is in a concentration in a range of 10 to 45 wt % of the liquid concentrate. Optionally, the suspending agent is a viscoelastic surfactant having an anionic, cationic, or zwitterionic headgroup, selected from tallow amidoamine oxide, ethoxylated ammonium chloride, alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkylbenzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols, quaternary amine compounds, amine oxide compounds, quad-diamines compounds, erucic dimethyl amidopropyl betaine, dicarboxylic coconut derived sodium salt, cocamidopropyl dimethylamine, cocamidopropyl betaine, alkylether hydroxypropyl sultaine, or amine oxides. Optionally, the suspending agent is in a concentration in a range of 0.25 to 10 wt % of the liquid concentrate.

EXAMPLES

To facilitate a better understanding of the various embodiments, the following examples are given.

An oil-based slurry was prepared by placing 49 g of base oil in a jar equipped with an overhead stirrer and a heater. With heating and mixing, some of the slurries included 1 g of a linear di-block styrene and ethylene/propylene as the suspending agent. The solution was heated to 120° F. (48.9° C.) and continually mixed until a clear, homogeneous solution was obtained. The solution was allowed to cool to room temperature. With mixing, 50 g of a dry form of a polyacrylamide friction reducer was added to the solution to form the oil-based slurry. The photos shown in FIGS. 4A-4H did not include the suspending agent. As can be seen in the photos shown in FIGS. 4G and 4H, the friction reducer (FR) exhibited increasing phase separation whereby the FR settled to the bottom of the container after 4 hours. However, as shown in FIGS. 4I-4O that did include the suspending agent, even after 41 hours, there was no phase separation that occurred, and the FR remained completely suspended and dispersed throughout the liquid continuous phase. This shows that the addition of the suspending agent provides exceptional suspending capabilities over many hours in an oil-based slurry.

Figure 5B:
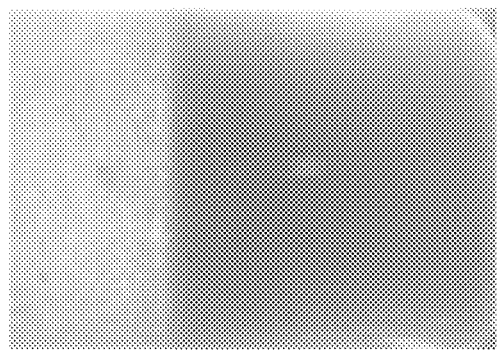
FIG. 5B is a photograph of a brine, a friction reducer, and a suspending agent showing the friction reducer remains suspended in the liquid continuous phase.
Figure 5A:
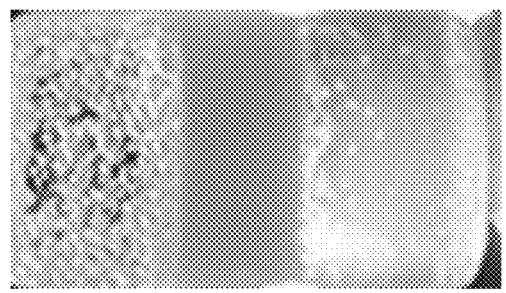
FIG. 5A is a photograph of a brine and a friction reducer without a suspending agent showing phase separation.

A water-based slurry was prepared by mixing 33.47 g of a divalent salt and 44.93 g of deionized water to form a brine as the continuous phase of the slurry. 0.80 g of a quaternary amine viscoelastic surfactant (VES) as an optional suspending agent and 20 g of a polyacrylamide anionic friction reducer polymer was then added into the brine and mixed at 600 rpm for 10 minutes at ambient temperature. The photo shown in FIG. 5A did not include the VES suspending agent. As can be seen in FIG. 5A, the friction reducer (FR) exhibited phase separation whereby the FR floated to the top of the container. However, as shown in FIG. 5B that did include the suspending agent, even after at least 36 days, there was no phase separation that occurred, and the FR remained completely suspended and dispersed throughout the liquid continuous phase. This shows that the addition of the suspending agent provides exceptional suspending capabilities over many days in a water-based slurry.

Therefore, the compositions, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more fluids, additives, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A liquid concentrate consisting essentially of:
   a liquid continuous phase, wherein the liquid continuous phase comprises an oil;
   a dispersed phase, wherein the dispersed phase comprises a water-soluble friction reducer; and
   a suspending agent, wherein the suspending agent is in a critical micelle concentration and has thixotropic properties.

2. The liquid concentrate according to claim 1, wherein the oil is in a concentration in a range of 50 to 85 wt % of the slurry.

3. The liquid concentrate according to claim 1, wherein the liquid concentrate is an invert emulsion, and wherein the dispersed phase further comprises water, and wherein at least a portion of the water-soluble friction reducer is dissolved in the water.

4. The liquid concentrate according to claim 1, wherein the liquid concentrate is an oil-based slurry, and wherein the water-soluble friction reducer is in a dry form.

5. The liquid concentrate according to claim 1, wherein the water-soluble friction reducer is an anionic polymer, a cationic polymer, a nonionic polymer, or an amphoteric polymer.

6. The liquid concentrate according to claim 5, wherein the polymer comprises monomers selected from the group consisting of acrylamide, acrylic acid, 2-acrylamido-2-methylpropane sulfonic acid, acrylamido tertiary butyl sulfonic acid, N,N-dimethylacrylamide, vinyl sulfonic acid, N-vinyl acetamide, N-vinyl formamide, itaconic acid, methacrylic acid, acrylic acid esters, methacrylic acid esters, (meth) acrylamidopropyltrimethyl ammonium halides, (meth) acryloyloxyethyltrimethyl ammonium halides, (meth) acryloyloxyethyltrimethyl ammonium methyl sulfate, diallyl dimethyl ammonium halides, diallylamine, methyldiallylamine, dimethylaminoethylmethacrylate, dimethylaminopropylmethacrylamide, and combinations thereof.

7. The liquid concentrate according to claim 1, wherein the water-soluble friction reducer is in a concentration in a range of 1 to 40 wt % of the liquid concentrate.

8. The liquid concentrate according to claim 1, wherein the suspending agent is a di-block copolymer of styrene/butadiene.

9. The liquid concentrate according to claim 1, wherein the suspending agent is in a concentration in a range of 0.5 to 54 wt % of the liquid concentrate.

10. A heterogeneous liquid concentrate consisting essentially of:
a liquid continuous phase, wherein the liquid continuous phase consists of water and a water-soluble salt to form saltwater;
a dispersed phase, wherein the dispersed phase consists of a water-soluble friction reducer in dry form; and
a suspending agent, wherein the suspending agent is in a critical micelle concentration and has thixotropic properties.

11. The heterogeneous liquid concentrate according to claim 10, wherein the water-soluble salt includes any combination of potassium, ammonium, calcium, magnesium, formate, carbonate, bromide, chloride, nitrate, or sulfate ions.

12. The heterogeneous liquid concentrate according to claim 10, wherein the water is in a concentration in a range of 10 to 50 wt % of the liquid concentrate.

13. The heterogeneous liquid concentrate according to claim 10, wherein the water-soluble salt is in a concentration in a range of 20 to 65 wt % of the liquid concentrate.

14. The heterogeneous liquid concentrate according to claim 10, wherein the water-soluble friction reducer is an anionic copolymer containing acrylamide and acrylic acid monomer residues or a terpolymer containing acrylamide/acrylic acid/2-acrylamido-2-methylpropane sulfonic acid (AMPS) monomer residues.

15. The heterogeneous liquid concentrate according to claim 10, wherein the water-soluble friction reducer is selected from the group consisting of a polyacrylamide, a polyacrylamide derivative, a synthetic polymer, an acrylamide copolymer, an anionic acrylamide copolymer, a cationic acrylamide copolymer, a non-ionic acrylamide copolymer, an amphoteric acrylamide copolymer, a polyacrylate, a polyacrylate derivative, a polymethacrylate, a polymethacrylate derivative, and combinations thereof.

16. The heterogeneous liquid concentrate according to claim 10, wherein the water-soluble friction reducer is in a concentration in a range of 10 to 45 wt % of the liquid concentrate.

17. The heterogeneous liquid concentrate according to claim 10, wherein the suspending agent is a viscoelastic surfactant having an anionic, cationic, or zwitterionic headgroup, selected from tallow amidoamine oxide, ethoxylated ammonium chloride, alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkylbenzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols, quaternary amine compounds, amine oxide compounds, quad-diamines compounds, erucic dimethyl amidopropyl betaine, dicarboxylic coconut derived sodium salt, cocamidopropyl dimethylamine, cocamidopropyl betaine, alkylether hydroxypropyl sultaine, or amine oxides.

18. The heterogeneous liquid concentrate according to claim 10, wherein the suspending agent is in a concentration in a range of 0.25 to 10 wt % of the liquid concentrate.

* * * * *